US012593204B2

(12) United States Patent
Liu et al.

(10) Patent No.: US 12,593,204 B2
(45) Date of Patent: Mar. 31, 2026

(54) SYSTEMS AND METHODS FOR AUTHORIZATION OF PROXIMITY BASED SERVICES

(71) Applicant: ZTE CORPORATION, Shenzhen (CN)

(72) Inventors: Yuze Liu, Shenzhen (CN); Shilin You, Shenzhen (CN); Jin Peng, Shenzhen (CN); Zhen Xing, Shenzhen (CN); Zhaoji Lin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 426 days.

(21) Appl. No.: 18/240,998

(22) Filed: Aug. 31, 2023

(65) Prior Publication Data

US 2024/0137757 A1 Apr. 25, 2024
US 2024/0236663 A9 Jul. 11, 2024

Related U.S. Application Data

(63) Continuation of application No. PCT/CN2021/092674, filed on May 10, 2021.

(51) Int. Cl.
*H04W 12/041* (2021.01)
*H04W 12/0433* (2021.01)
*H04W 12/06* (2021.01)

(52) U.S. Cl.
CPC ..... *H04W 12/041* (2021.01); *H04W 12/0433* (2021.01); *H04W 12/06* (2013.01)

(58) Field of Classification Search
CPC ........... H04W 12/041; H04W 12/0433; H04W 12/06; H04W 4/02; H04W 88/04; H04W 92/18; H04W 12/08; H04W 12/03
See application file for complete search history.

(56) References Cited

U.S. PATENT DOCUMENTS

2023/0068196 A1* 3/2023 Sasi ...................... H04L 9/0836
2023/0078317 A1* 3/2023 Xing ........................ H04B 7/15
370/315

(Continued)

FOREIGN PATENT DOCUMENTS

CN 106134232 A 11/2016
CN 106470420 A 3/2017

(Continued)

OTHER PUBLICATIONS

3rd Generation Partnership Project, "Study on security aspects of enhancement for proximity based services in the 5G System" Technical Specification Group Services and System Aspects, (5GS) (Release 17), 3GPP TR 33.847 V0.5.0, Mar. 17, 2021. (Release 17).

(Continued)

*Primary Examiner* — Mazda Sabouri
(74) *Attorney, Agent, or Firm* — Foley & Lardner LLP

(57) ABSTRACT

Presented are systems and methods for authorization of proximity based services. A first wireless communication device may send, to a second wireless communication device, a message to access a network via the second wireless communication device as a relay node, using at least one authentication and key management for applications (AKMA) service. The message may include an AKMA key identifier (A-KID) and a freshness parameter. The first wireless communication device may generate a validation token to validate against another validation token of the second wireless communication device. The first wireless communication device may generate the validation token using the freshness parameter and a proximity based service function (PBSF) key $(K_{PBSF})$.

20 Claims, 10 Drawing Sheets

(56) References Cited

U.S. PATENT DOCUMENTS

| | | | | |
|---|---|---|---|---|
| 2023/0284030 A1* | 9/2023 | Baskaran | ................ | G08G 5/53 |
| | | | | 455/411 |
| 2024/0015008 A1* | 1/2024 | Morchon | ............. | H04L 9/0833 |
| 2024/0137765 A1* | 4/2024 | Jost | ....................... | H04W 12/69 |

FOREIGN PATENT DOCUMENTS

| | | | |
|---|---|---|---|
| CN | 107710798 A | 2/2018 | |
| CN | 108141755 A | 6/2018 | |
| WO | WO-2019/000405 A1 | 1/2019 | |

OTHER PUBLICATIONS

International Search Report and Written Opinion for PCT Appl. No. PCT/CN2021/092674, mailed Feb. 10, 2022 (8 pages).
Communication pursuant to Article 94(3) EPC for EP Appl. No. 21941119.6, dated Jul. 2, 2025 (7 pages).

* cited by examiner

300

400

500

1050

SYSTEMS AND METHODS FOR AUTHORIZATION OF PROXIMITY BASED SERVICES

CROSS-REFERENCE TO RELATED APPLICATION

This application claims the benefit of priority under 35 U.S.C. § 120 as a continuation of PCT Patent Application No. PCT/CN2021/092674, filed on May 10, 2021, the disclosure of which is incorporated herein by reference in its entirety.

TECHNICAL FIELD

The disclosure relates generally to wireless communications, including but not limited to systems and methods for authorization of proximity based services.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A first wireless communication device may send, to a second wireless communication device, a message to access a network via the second wireless communication device as a relay node, using at least one authentication and key management for applications (AKMA) service. The message may include an AKMA key identifier (A-KID) and a freshness parameter. The first wireless communication device may generate a validation token to validate against another validation token of the second wireless communication device. The first wireless communication device may generate the validation token using the freshness parameter and a proximity based service function (PBSF) key ($K_{PBSF}$).

In some embodiments, the first wireless communication device may comprise a remote user equipment (UE). The second wireless communication device may comprise a relay UE. In some embodiments, the first wireless communication device may generate the $K_{PBSF}$ prior to or after sending an application session establishment request message to a remote PBSF. In some embodiments, the first wireless communication device may perform encryption on the freshness parameter using the $K_{PBSF}$, to output an encrypted version of the freshness parameter. The first wireless communication device may send the message to the second wireless communication device. The message may include the encrypted version of the freshness parameter. In some embodiments, the first wireless communication device may perform encryption on the A-KID using the $K_{PBSF}$, to output an encrypted version of the A-KID. The first wireless communication device may send the message to the second wireless communication device. The message may include the encrypted version of the A-KID.

In some embodiments, the message may further include an identifier of the remote PBSF. In some embodiments, the remote PBSF may use the freshness parameter from the second wireless communication device or a relay PBSF of the second wireless communication device, and the $K_{PBSF}$ from an AKMA anchor function (AAnF), to generate the another validation token. In some embodiments, the remote PBSF may receive an encrypted version of the freshness parameter from the second wireless communication device or the relay PBSF, and recover the freshness parameter using the $K_{PBSF}$ from the AAnF. In some embodiments, the second wireless communication device may receive the another validation token directly from the remote PBSF, or indirectly from the remote PBSF via the relay PBSF. In some embodiments, the first wireless communication device may send a direct security mode complete message to the second wireless communication device. The first wireless communication device may receive a direct communication accept message from the second wireless communication device.

In some embodiments, the first wireless communication device may receive a second freshness parameter associated with the validation token from the second wireless communication device. The first wireless communication device may generate a session key (Ksession) for a communication session between the first wireless communication device and the second wireless communication device using the second freshness parameter. In some embodiments, the message may include a service code. In some embodiments, the $K_{PBSF}$ can be associated with the service code, the service code configured to specify or restrict to use of a particular service to access the network. In some embodiments, the validation token may comprise at least one of: a validation key ($K_{DIRECT}$) or an identifier (ID) of the $K_{DIRECT}$.

At least one aspect is directed to a system, method, apparatus, or a computer-readable medium. A remote proximity based service function (PBSF) may generate a validation token to be validated against another validation token by a first wireless communication device. The remote PBSF may use a freshness parameter and a PBSF key ($K_{PBSF}$) to generate the validation token. The first wireless communication device may send, to a second wireless communication device, a message to access a network via the second wireless communication device as a relay node, using at least one authentication and key management for applications (AKMA) service. The message may include an AKMA key identifier (A-KID) and the freshness parameter.

In some embodiments, the first wireless communication device may comprise a remote user equipment (UE). The second wireless communication device may comprise a relay UE. In some embodiments, the first wireless communication device may generate the $K_{PBSF}$ prior to or after sending an application session establishment request message to a remote PBSF. In some embodiments, the first wireless communication device may perform encryption on the freshness parameter using the $K_{PBSF}$, to output an encrypted version of the freshness parameter. The first wireless communication device may send the message to the second wireless communication device, the message including the encrypted version of the freshness parameter. In some embodiments, the first wireless communication device may perform encryption on the A-KID using the $K_{PBSF}$, to output an encrypted version of the A-KID. The first wireless communication device may send the message to the second wireless communication device, the message including the encrypted version of the A-KID. In some embodiments, the message may further include an identifier of the remote PBSF. In some embodiments, the remote PBSF may generate the validation token using the freshness parameter from the second wireless communication device or a relay PBSF of the second wireless communication device, and the $K_{PBSF}$ from an AKMA anchor function (AAnF). In some embodiments, the remote PBSF may receive an encrypted version of the freshness parameter from the second wireless communication device or the relay PBSF. The remote PBSF may recover the freshness parameter using the $K_{PBSF}$ from the AAnF.

In some embodiments, the remote PBSF may send the validation token directly to the second wireless communication device, or indirectly to the second wireless communication device via the relay PBSF. In some embodiments, the first wireless communication device may receive, from the second wireless communication device, a direct security mode complete message. The first wireless communication device may send a direct communication accept message to the second wireless communication device. In some embodiments, the first wireless communication device may receive a second freshness parameter associated with the validation token from the second wireless communication device. The first wireless communication device may generate, using the second freshness parameter, a session key (Ksession) for a communication session between the first wireless communication device and the second wireless communication device. In some embodiments, the message may include a service code or the $K_{PBSF}$ can be associated with the service code. The service code may be configured to specify or restrict to use of a particular service to access the network. In some embodiments, the validation token may comprise at least one of: a validation key ($K_{DIRECT}$) or an identifier (ID) of the $K_{DIRECT}$.

The systems and methods presented herein include a novel approach for a first wireless communication device to access a network via a second wireless communication device as a relay node using AKMA services (e.g., a UE and/or a PBSF can use AKMA services). If the first wireless communication device (e.g., a remote UE) attempts to access a network using the second wireless communication device (e.g., UE-to-network relay), the first wireless communication device may send/transmit/communicate an AKMA key identifier (A-KID), a freshness parameter (e.g., Nonce 1), and/or an identifier of a remote PBSF (e.g., a remote DDNMF ID) via a message (e.g., a direct communication request message). The first wireless communication device and/or the remote PBSF may use a $K_{PBSF}$ and/or the freshness parameter to separately/independently derive/calculate/generate a validation token (e.g., a $K_{DIRECT}$ and/or a $K_{DIRECT}$ ID). The remote PBSF may send/specify/provide/communicate the validation token (e.g., $K_{DIRECT}$) to the second wireless communication device (e.g., relay UE) directly and/or via a relay PBSF.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
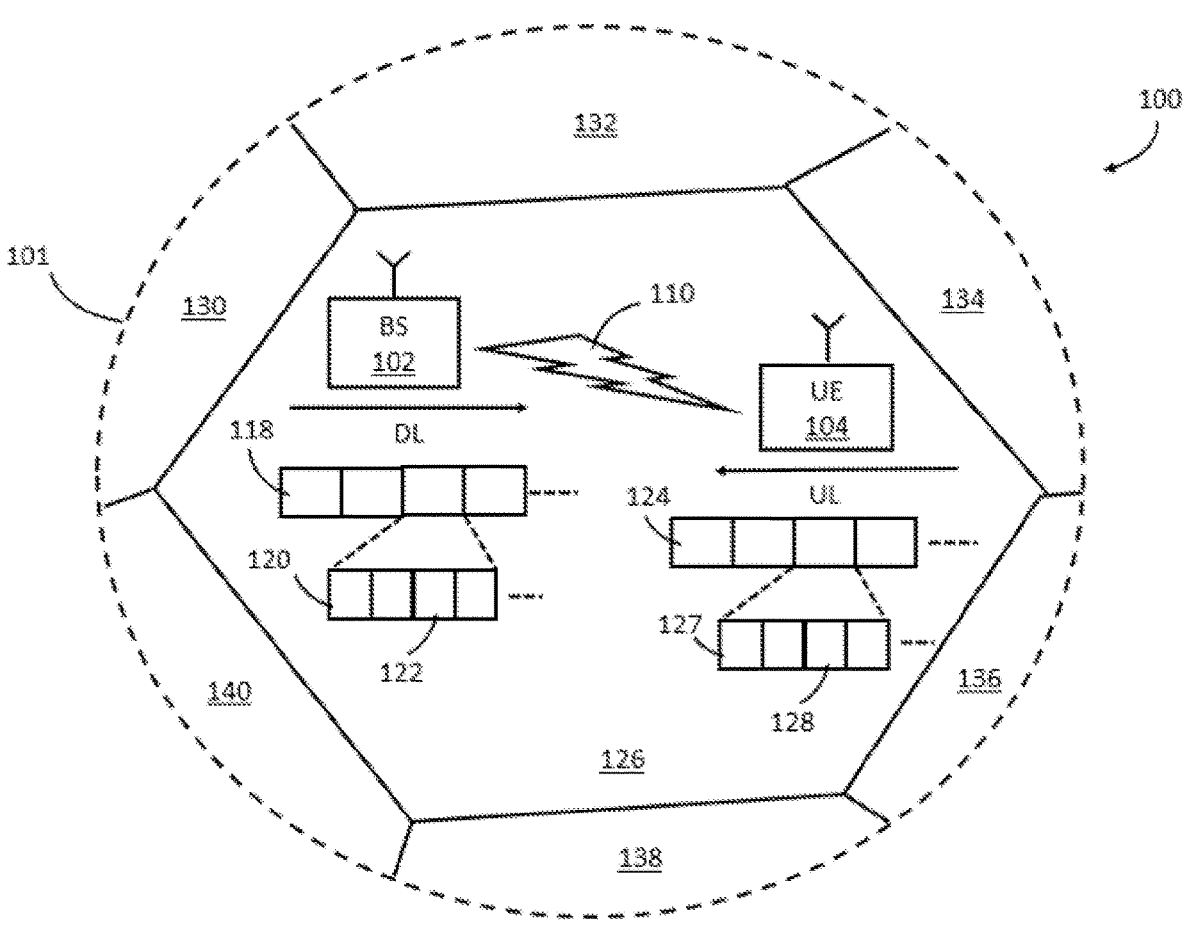
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
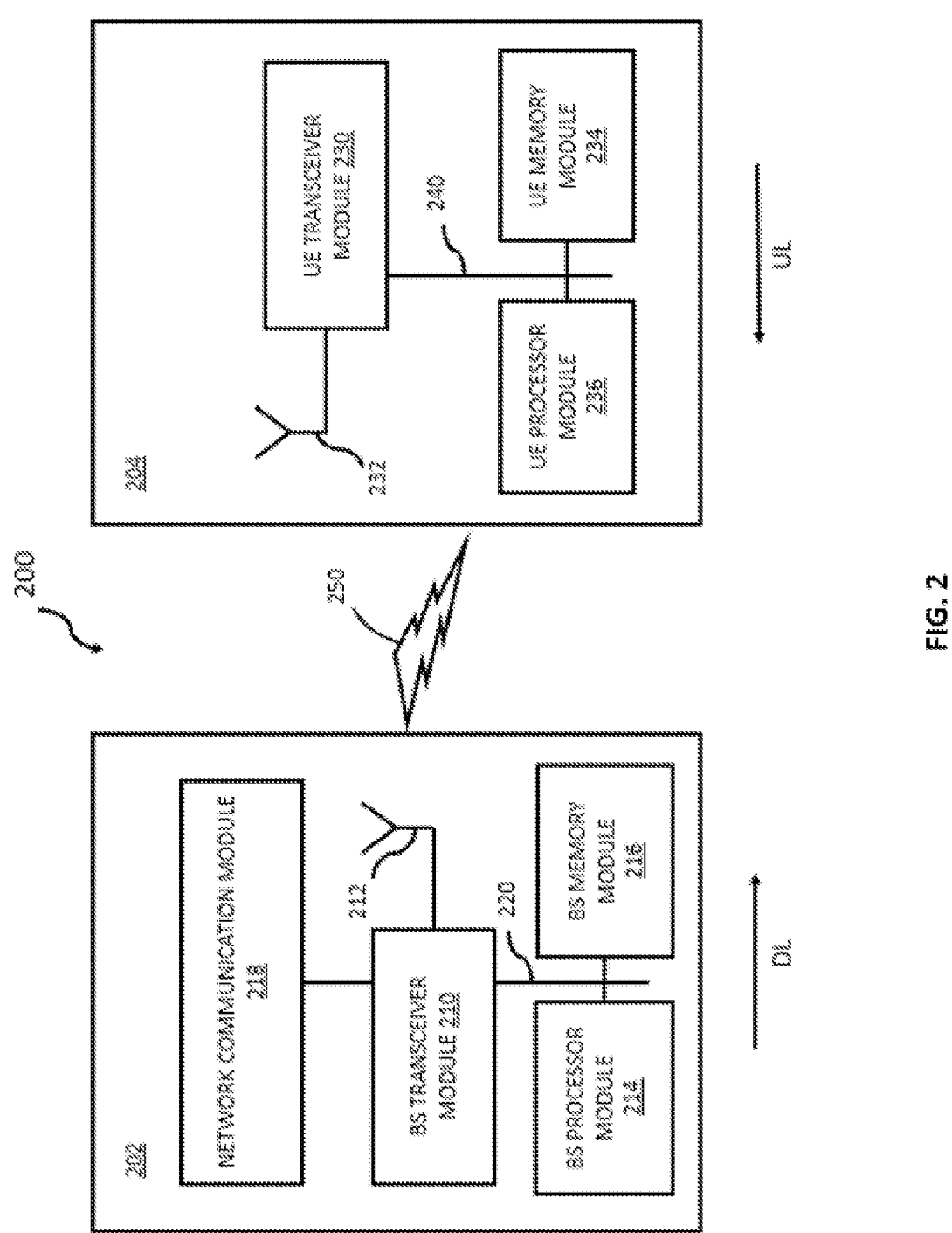
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for Authorization of Proximity Based Services

Certain systems (e.g., 5G new radio (NR), Next Generation (NG) systems, 3GPP systems, and/or other systems) may permit/authorize a first wireless communication device (e.g., a UE, a terminal, or a served node) to access a network (e.g., a 5GC network and/or other networks) via a second wireless communication device as a relay node. For example, 3GPP systems can authorize a first UE to access a 5GC network via a 5G UE-to-network relay (e.g., via a second UE). In yet another example, certain systems can authorize a second UE to operate as a relay UE to provide the first UE with access to a network (e.g., a 5GC network). Without proper authorization/authentication/validation, unauthorized entities may access a network (e.g., a 5GC network and/or other networks) via a second wireless communication device (e.g., UE-to-network relay). In some embodiments, unauthorized entities may operate as the second wireless communication device to improperly provide access (e.g., unauthorized access) to the network. Systems without proper authorization techniques/services may be vulnerable to unauthorized attempts/attacks to access a network (e.g., distributed denial-of-service (DDoS) attacks and/or other types of attacks), which can lead to (or cause) unauthorized service usage of a network/system (e.g., 5G system (5GS)) and/or a wireless communication device (e.g., UE-to-Network Relay).

Figure 3:
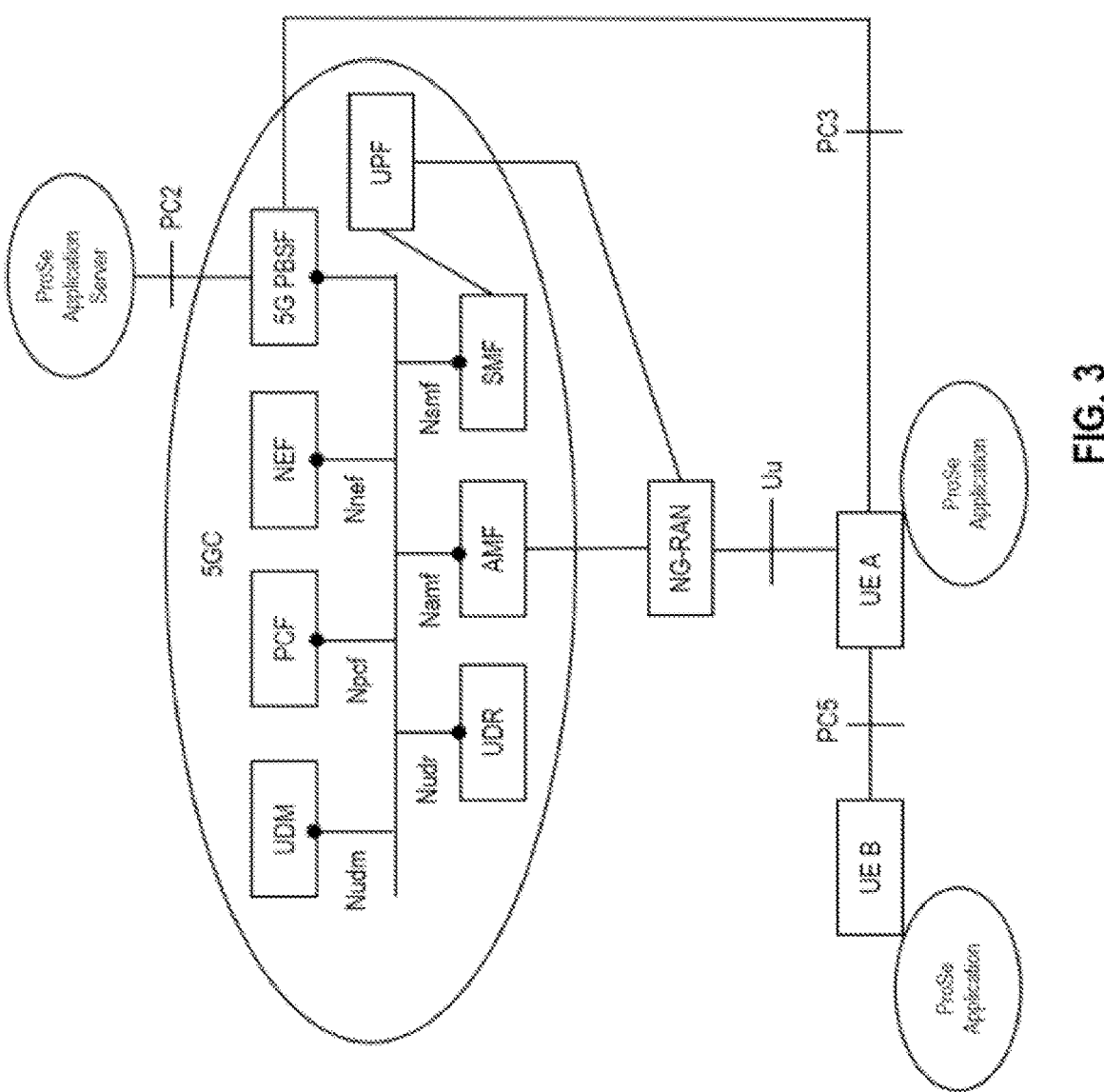
FIG. 3 illustrates example configurations of an embodiment for a user plane based architecture, in accordance with some embodiments of the present disclosure.

Referring now to FIG. 3, depicted is a configuration 300 of an embodiment for a user plane based architecture. In certain networks (e.g., 5GC network), one or more functions (such as a 5G direct discovery name management function (DDNMF)) can be used as network functions. A 5GC network (or other networks) may comprise one or more components/elements, such as unified data management (UDM), a user data repository (UDR), a policy control function (PCF), an access and mobility management function (AMF), a network exposure function (NEF), a session management function (SMF), a user plane function (UPF), and/or a 5G DDNMF. From an architecture point of view, a 5G DDNMF may include/perform one or more functions that are similar to the function(s) performed by other network functions (e.g., a DDNMF component of a proximity service (ProSe) function). In some embodiments, a ProSe function can allow a plurality of wireless communication devices (e.g., UE A and/or UE B) to detect/identify each other, and/or to communicate directly with each other. In some embodiments, a user plane based 5G ProSe architecture may reuse certain reference points, such as the PC2 and/or PC3 reference points illustrated in FIG. 3.

Figure 4:
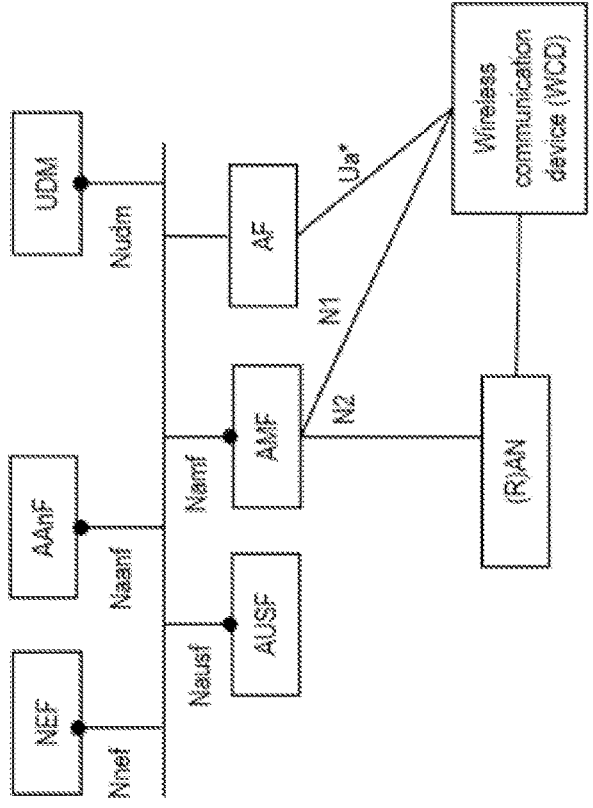
FIG. 4 illustrates example configurations of an embodiment for an authentication and key management for applications (AKMA) service, in accordance with some embodiments of the present disclosure.

Referring now to FIG. 4, depicted is a configuration 400 of an embodiment for an authentication and key management for applications (AKMA) service. An AKMA anchor function (AAnF) may include or correspond to (or be referred to as) an anchor function in a home public land mobile network (HPLMN). In embodiments, the AKMA AF may not get a key to decrypt the message from an UE. Thus the AKMA AF should locate a place to get the key. The network may have only one AAnF (or anchor function) for AKMA service, and all AKMA AFs can connect to this anchor function to get the key. The AAnF can store/maintain an AKMA anchor key ($K_{AKMA}$), and/or other network keys, for an AKMA service. An authentication server function (AUSF) can provide/indicate/specify the $K_{AKMA}$ responsive to a completion, by a wireless communication device, of a successful primary authentication (e.g., 5G primary authentication). In some embodiments, the AAnF may generate/configure/create/provide key material to be used by the wireless communication device (e.g., a UE) and/or an application function (AF). The AAnF can maintain/store the AKMA context of the wireless communication device.

Figure 5:
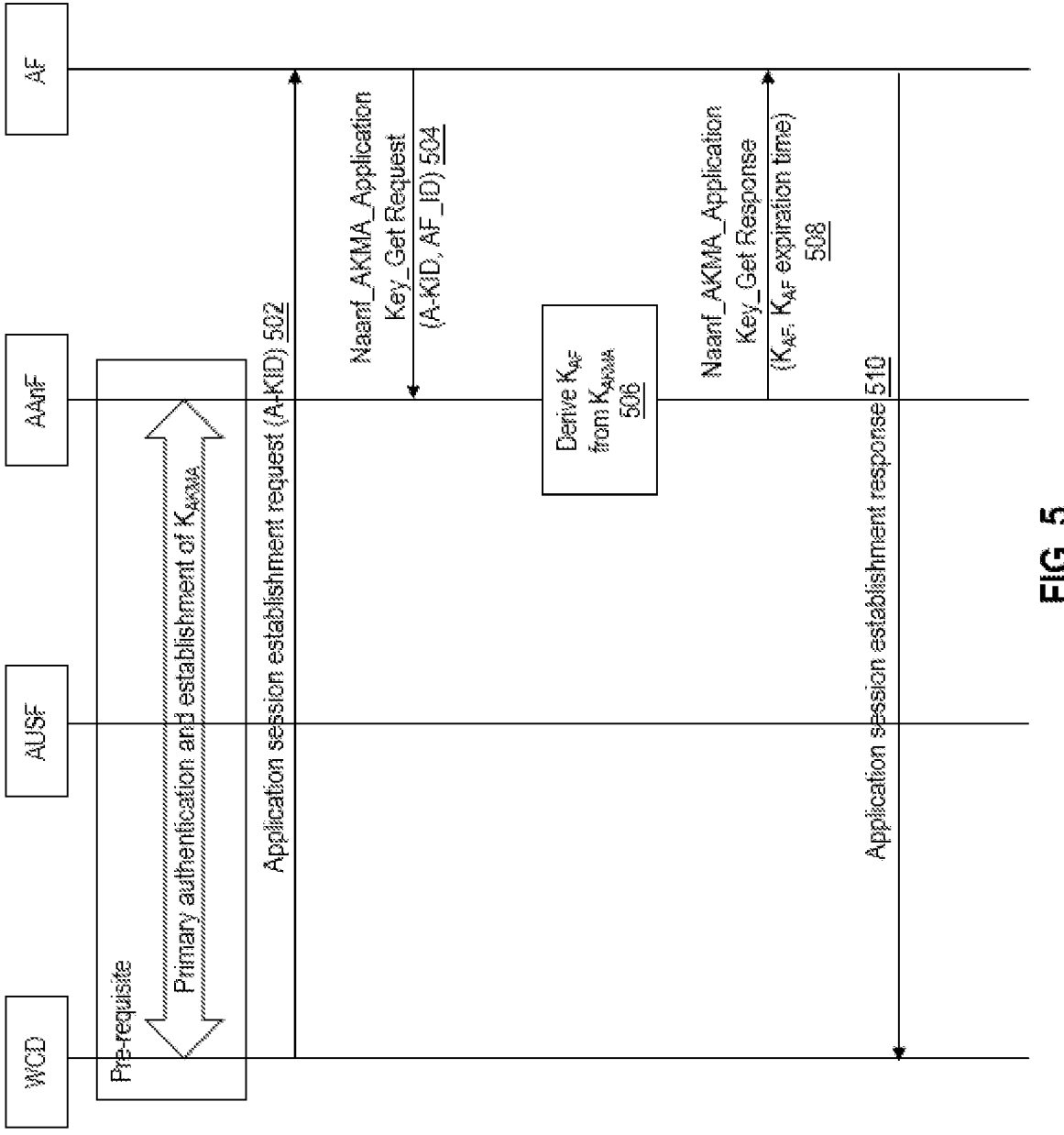
FIG. 5 illustrates a communication diagram of an example process for establishment of an application session, in accordance with some embodiments of the present disclosure.

Referring now to FIG. 5, depicted is a communication diagram of an embodiment for a process 500 for requesting one or more keys (e.g., AKMA keys). For instance, the AF (e.g., an AKMA AF) may request one or more AF specific AKMA keys from the AAnF via the process 500. In step 502, the wireless communication device (e.g., UE) may generate/create/determine/configure at least one $K_{AKMA}$ and/or at least one AKMA key identifier (A-KID). The wireless communication device may generate/create/configure/determine the $K_{AKMA}$ and/or the A-KID according to (or based on) an intermediate key (KAUSF) that is stored/maintained by the AUSF. In some embodiments, the wireless communication device may generate the $K_{AKMA}$ and/or the A-KID prior to initiating communication with the AKMA AF. If the wireless communication device initiates communication with the AKMA AF, the wireless communication device may provide/specify/indicate the derived A-KID via a message (e.g., an application session establishment request message and/or other messages). The wireless communication device may derive/calculate/determine an AKMA application key ($K_{AF}$) prior to (or after) sending the message.

In step 504, the AF can have/access/maintain an active context associated with (or related to) the A-KID. If the AF (e.g., the AKMA AF) does not have an active context associated with the A-KID, the AF may send/transmit/communicate/broadcast a request (e.g., a Naanf_AKMA_ApplicationKey_Get request and/or other requests) to the AAnF with the A-KID. The AF may send the request to obtain/acquire/receive the $K_{AF}$ for the wireless communication device. In some embodiments, the AF may provide/specify/indicate the identity of the AF (AF_ID) to the AAnF via the request. For example, the request may include/provide the AF_ID. The AF_ID may include or correspond to a fully qualified domain name (FQDN) of the AF, a Ua* security protocol identifier, and/or other information. The Ua* security protocol identifier may identify/specify/indicate a security protocol used by the AF and/or the wireless communication device. In some embodiments, the AAnF may verify/confirm whether the AAnF is able to provide the service to the AF. The AAnF may verify whether the AAnF is able to provide the service based on (or according to) a configured local policy and/or an authorization information/policy provided by the network repository function (NRF) using the AF_ID. If the AAnF confirms the AAnF is able to provide the service to the AF, one or more of the following procedures are executed. If, instead, the AAnF confirms the AAnF is unable to provide the service to the AF, the AAnF may reject/dismiss the procedure. In some embodiments, the AAnF can verify/confirm whether the subscriber is authorized to use AKMA. For instance, the AAnF can confirm whether the subscriber is authorized to use AKMA according to (or based on) a presence (or absence) of a $K_{AKMA}$ (specific to a wireless communication device) identified by the A-KID. If the $K_{AKMA}$ is present in the AAnF, the AAnF may continue with step 506. If the $K_{AKMA}$ is absent from the AAnF, the AAnF may continue with step 508 (e.g., with an error response).

In step 506, the AAnF may derive/calculate/generate/compute the $K_{AF}$ according to (or based on) the $K_{AKMA}$ (e.g., if the AAnF does not already have the $K_{AF}$). In step 508, the AAnF may send/transmit/communicate a response (e.g., a Naanf_AKMA_ApplicationKey_Get response) to the AF. In some embodiments, the response may include/provide/specify/indicate the $K_{AF}$ and/or the expiration time of the $K_{AF}$. The expiration time of the $K_{AF}$ may specify/provide a time period for which the $K_{AF}$ is valid. In step 510, the AF may send/transmit/communicate a response (e.g., an application session establishment response) to the wireless communication device. If the information in step 508 (e.g., the $K_{AF}$ and/or the expiration time of the $K_{AF}$) indicates a failure of the AKMA key request, the AF may reject/dismiss the response (e.g., the application session establishment response) by including a failure cause. If the AF rejects the response, the wireless communication device may trigger/send/communicate another request (e.g., another application session establishment request) to the AKMA AF. The another request may include/provide/specify the latest A-KID to the AKMA AF.

In some embodiments, a first wireless communication device (e.g., a remote UE) may utilize AKMA services, and/or can derive/calculate/generate/determine/compute a proximity based service function (PBSF) key ($K_{PBSF}$). The $K_{PBSF}$ can be used as a proximity service long-term key. In some embodiments, the PBSF may include the DDNMF, a ProSe key management function (PKMF), and/or other functions. The first wireless communication device can attempt to access a network (e.g., a 5GC network) via a relay node (e.g., UE-to-network relay). In some embodiments, the first wireless communication device may attempt to access the network (e.g., via a relay node) by sending a message (e.g., a direct communication request message and/or other messages) to a second wireless communication device (e.g., a relay UE). The message (e.g., the direct communication request message) can include/provide/specify/indicate the A-KID, a freshness parameter (e.g., Nonce_1 and/or other freshness parameters), and/or an identifier of the remote PBSF (e.g., remote DDNMF ID and/or other identifiers). The identifier of the remote PBSF (and/or other identifiers) can be used to identify/locate/find the right/appropriate PBSF for the first wireless communication device.

Figure 6:
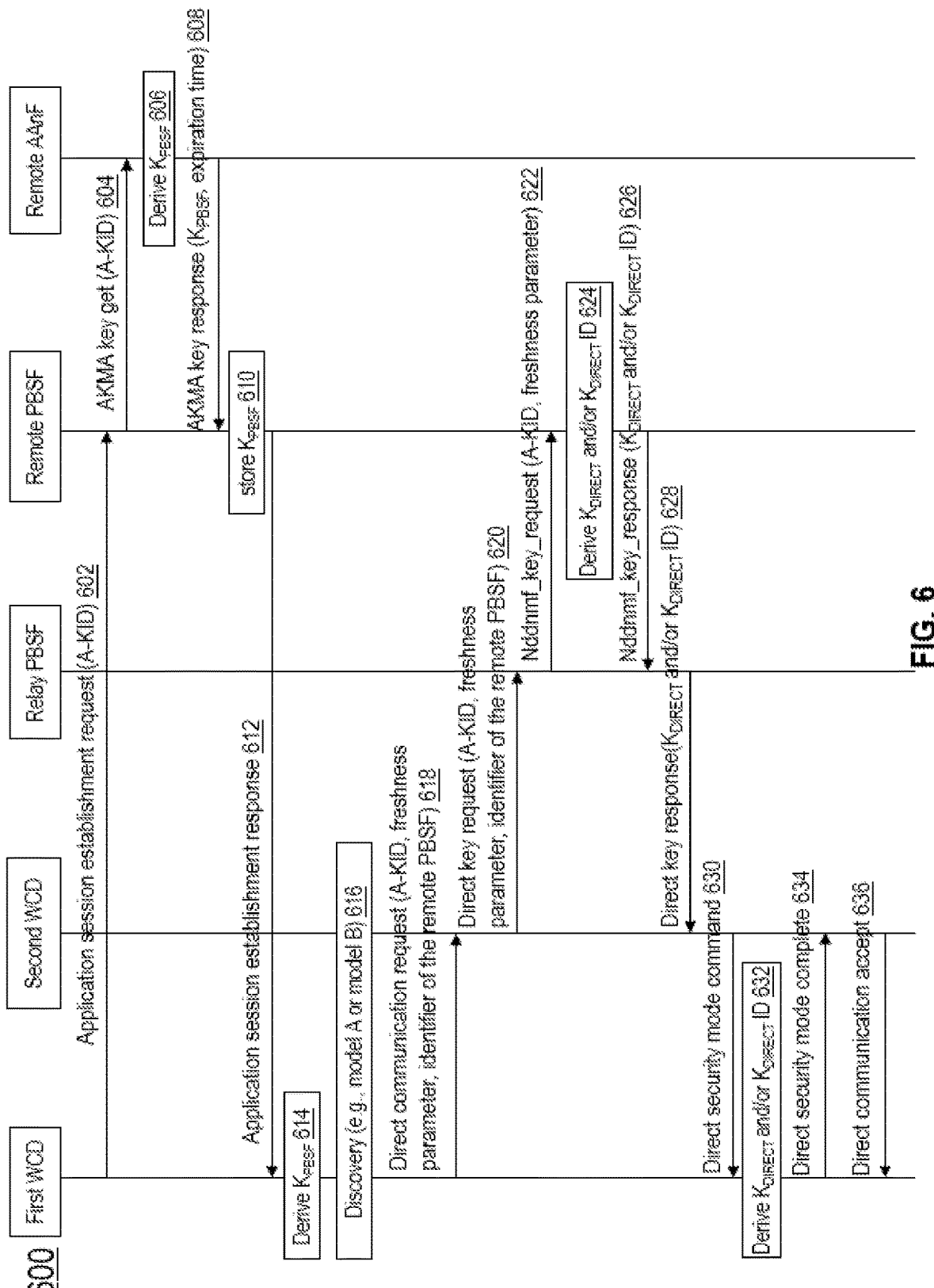
FIGS. 6-9 illustrate communication diagrams of one or more example processes for accessing a network by using another wireless communication device as a relay node, in accordance with some embodiments of the present disclosure.

Referring now to FIG. 6, depicted is a communication diagram of an embodiment for a process 600 for accessing a network by using another wireless communication device (e.g., a relay UE) as a relay node (e.g., UE-to-network relay). In step 602, a first wireless communication device (e.g., a remote UE) may initiate communication with a remote PBSF (e.g., a remote DDNMF) by sending a message (e.g., an application session establishment request message and/or other messages) to the remote PBSF. The message may include/provide/indicate a derived/calculated/generated A-KID (e.g., generated by the first wireless communication device). The first wireless communication device may derive/generate/create/determine the $K_{PBSF}$ prior to or after sending the message to the remote PBSF.

From step 604 to step 608, the remote PBSF may determine whether the remote PBSF has (or can access) an active context associated with the A-KID. If the remote PBSF does not have (or cannot access) the active context, the remote PBSF may send/transmit/communicate a request (e.g., a Naanf_AKMA_ApplicationKey_Get request and/or other requests) to a remote AAnF. In some embodiments, the request may include/indicate the A-KID and/or other information. The remote PBSF may send the request to the remote AAnF to obtain/receive the $K_{PBSF}$ for the first wireless communication device. In some embodiments, the remote PBSF may include the identifier of the remote PBSF in the request. The remote AAnF may derive/calculate/determine the $K_{PBSF}$ from the $K_{AKMA}$ (e.g., if the remote AAnF does not already have the $K_{PBSF}$). The remote AAnF may send/transmit/communicate a response (e.g., a Naanf_AKMA_ApplicationKey_Get response) to the remote PBSF. In certain embodiments, the response may include/provide/specify/indicate the $K_{PBSF}$ and/or the expiration time of the $K_{PBSF}$.

From step 610 to step 612, the remote PBSF may store/maintain the $K_{PBSF}$, and/or send/transmit a response (e.g., an application session establishment response) to the first wireless communication device (e.g., remote UE). In step 614, the first wireless communication device may derive/generate/create/determine the $K_{PBSF}$. In certain embodiments, the first wireless communication device may generate the $K_{PBSF}$ if the first wireless communication device does not derive the $K_{PBSF}$ prior to step 602 (e.g., prior to sending an application session establishment request message to a remote PBSF). In step 616, the first wireless communication device may discover/identify a second wireless communication device (e.g., a relay UE) based on (or by using) at least one of a plurality of approaches (e.g., model A and/or model B). In step 618, the first wireless communication device may send/transmit/communicate a request/message (e.g., a direct communication request) to the second wireless communication device. In some embodiments, the message/request may include/provide/specify/indicate the A-KID, the freshness parameter (e.g., Nonce_1), and/or a service code. The service code may be configured to specify and/or restrict the use of a particular service to access the network. The particular service may be described/defined/characterized by aspects such as rate (e.g., charges/billing), data rate/limit, quality of service, and/or other aspects, and may be offered/bundled/specified by a service provider. A service code can be used to identify a connectivity service that the ProSe UE-to-network relay UE (e.g., relay/second wireless communication device) provides, and an authorized user the ProSe UE-to-Network relay UE would offer service to, and may select the related security policies or information, e.g., necessary for authentication and authorization between the remote UE (e.g., remote/first wireless communication device) and the ProSe UE-to-network Relay UE. The first wireless communication device may use the $K_{PBSF}$ to encrypt the freshness parameter (e.g., to output an encrypted version of the freshness parameter, thereby protecting against the second wireless communication device knowing the freshness parameter). In some embodiments, the message/request may include the A-KID, the freshness parameter, and/or the identifier of the remote PBSF (e.g., the remote DDNMF ID). The first wireless communication device may encrypt the A-KID according to (or by using) the $K_{PBSF}$.

In step 620, the second wireless communication device (e.g., a relay UE) may send/transmit/communicate a message (e.g., a direct key request message) to a relay PBSF (e.g., a relay DDNMF). The message can include/provide/specify the parameter(s) (e.g., the A-KID, the freshness parameter, and/or the identifier of the remote PBSF) included in the prior message (e.g., direct communication request) from the first wireless communication device to the second wireless communication device. In step 622, the relay PBSF may obtain the identifier of the remote PBSF from the received message (e.g., a direct key request message). The relay PBSF may send/transmit/communicate a Nddnmf_key_request message (or other messages) to the remote PBSF (e.g., identified using the identifier of the remote PBSF). In some embodiments, the relay PBSF may obtain/determine the identifier of the remote PBSF from the received message (e.g., the direct key request message), if the identifier is included in the received message. In some embodiments, the relay PBSF may obtain the identifier of the remote PBSF by using (or according to) the A-KID (e.g., if the A-KID included in the received message (the direct key request message) is unencrypted). The Nddnmf_key_request message can include/provide/specify/indicate the A-KID, the freshness parameter (e.g., Nonce 1 and/or other freshness parameters), and/or other information. If the service code is included in step 618 (e.g., in the direct communication request from the first wireless communication device to the second wireless communication device), the Nddnmf_key_request message (or other messages) may include the service code.

In step 624, the remote PBSF may use the $K_{PBSF}$ (e.g., stored in step 610) to decrypt/recover the encrypted A-KID, the freshness parameter, and/or other information. The remote PBSF can derive/determine/generate another validation token of the second wireless communication device (e.g., $K_{DIRECT}$). The remote PBSF can generate the another validation token (e.g., $K_{DIRECT}$) according to (or by using) the freshness parameter (e.g., Nonce 1) and/or the $K_{PBSF}$ (e.g., provided by the AAnF to the remote PBSF). In some embodiments, the remote PBSF may determine/generate other validation tokens, such as an identifier (ID) of the $K_{DIRECT}$ ($K_{DIRECT}$ ID). If the service code is received by the remote PBSF (e.g., via the Nddnmf_key_request message), the remote PBSF may determine whether the first wireless communication device can use the service indicated by the service code. In step 626, the remote PBSF may send/provide/transmit the another validation token(s) (e.g., $K_{DIRECT}$ and/or $K_{DIRECT}$ ID) to the relay PBSF via a Nddnmf_key_response message (or other response messages). If the $K_{DIRECT}$ ID is also derived by the remote PBSF, the Nddnmf_key_response message may include and/or provide/specify the $K_{DIRECT}$ ID to the relay PBSF. In step 628, the relay PBSF may forward/provide/communicate/send the another validation token(s) (e.g., the $K_{DIRECT}$ and/or $K_{DIRECT}$ ID) in a response message (e.g., a direct key response message) to the second wireless communication device. If the $K_{DIRECT}$ ID is received by the relay PBSF, the response message (e.g., from the relay PBSF to second wireless communication device) can include/indicate the $K_{DIRECT}$ ID.

In step 630, the second wireless communication device (e.g., the relay UE) may send/transmit/provide a command message (e.g., a direct security mode command message and/or other messages) to the first wireless communication device (e.g., the remote UE). The second wireless communication device may send/provide/transmit a second freshness parameter via the command message. The second freshness parameter can be used (e.g., by the first wireless communication device) to generate/create/determine a session key (Ksession) for a communication session between the first wireless communication device and the second wireless communication device. If the $K_{DIRECT}$ ID is received by the second wireless communication device, the command message may include/provide/specify the $K_{DIRECT}$ ID. The command message may be integrity protected according to (or by using) a security key derived from (or based on) the another validation token(s) (e.g., $K_{DIRECT}$ and/or $K_{DIRECT}$ ID).

In step 632, the first wireless communication device can derive/generate/create/determine at least one validation token (e.g., the $K_{DIRECT}$). The first wireless communication device may determine the validation token(s) by using (or according to) the freshness parameter (e.g., Nonce 1) and/or the $K_{PBSF}$. The first wireless communication device may validate/compare/match the validation token(s) (e.g., generated by the first wireless communication device) against the another validation token(s) (e.g., derived/generated by the second wireless communication device). If the validation token(s) and the another validation token(s) match (or correspond to each other), an attempt to access the network (e.g., attempt by the first wireless communication device) via the second wireless communication device may be authenticated/validated. The second wireless communication device may use the another validation token (and/or another key derived from the another validation token) to protect/encrypt the command message (e.g., the direct security command message). If the second wireless communication device sends/provides/indicates the second freshness parameter to the first wireless communication device, the first wireless communication device can use the freshness parameter(s) to derive/generate/determine a new key to confirm/verify the security of the message. Otherwise, the first wireless communication device can use the validation token(s) to confirm/verify the security of the message.

In some embodiments, the first wireless communication device may derive/determine/generate the $K_{DIRECT}$ ID. If the second wireless communication device sends/provides the second freshness parameter via the command message (e.g., the direct security mode command message), the first wireless communication device may generate/determine/create a Ksession. In some embodiments, the second wireless communication device may use a security key (e.g., $K_{DIRECT}$ and/or another key derived from $K_{DIRECT}$) to protect/encrypt/secure the command message. The first wireless communication device may perform a security verification of the command message. If the first wireless communication device receives a $K_{DIRECT}$ ID from the second wireless communication device, the first wireless communication device may compare/match the received $K_{DIRECT}$ ID (e.g., received from the second wireless communication device) against the generated/determined $K_{DIRECT}$ ID (e.g., generated by the first wireless communication device). If the received $K_{DIRECT}$ ID and the generated $K_{DIRECT}$ ID match (or correspond to each other), an attempt to access the network (e.g., attempt by the first wireless communication device) via the second wireless communication device may be authenticated/validated. In step 634, the first wireless communication device may respond with a complete message (e.g., a direct security mode complete message and/or other messages) to the second wireless communication device. In step 638, the second wireless communication device may send/transmit/provide a direct communication accept message (or other messages) to the first wireless communication device.

Figure 7:
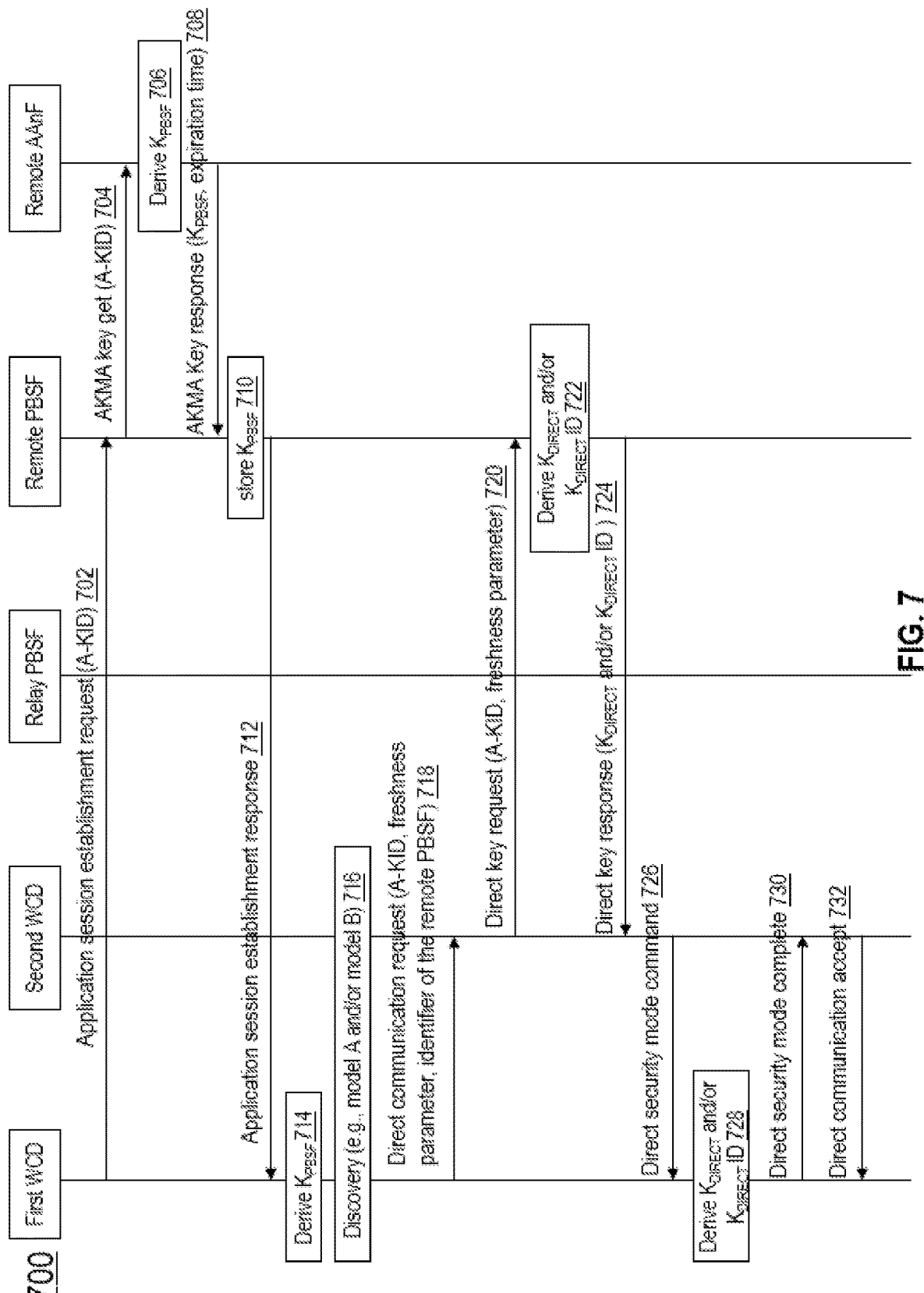

Referring now to FIG. 7, depicted is a communication diagram of an embodiment for a process 700 for accessing a network by using another wireless communication device (e.g., a relay UE) as a relay node (e.g., UE-to-network relay). In step 702, a first wireless communication device (e.g., a remote UE) may initiate communication with a remote PBSF (e.g., a remote DDNMF) by sending a message (e.g., an application session establishment request message and/or other messages) to the remote PBSF. The message may include/provide/indicate a derived/calculated/generated A-KID (e.g., generated by the first wireless communication device). The first wireless communication device may derive/generate/create/determine the $K_{PBSF}$ prior to or after sending the message to the remote PBSF.

From step 704 to step 708, the remote PBSF may determine whether the remote PBSF has (or can access) an active context associated with the A-KID. If the remote PBSF does not have (or cannot access) the active context, the remote PBSF may send/transmit/communicate a request (e.g., a Naanf_AKMA_ApplicationKey_Get request and/or other requests) to a remote AAnF. In some embodiments, the request may include/indicate the A-KID and/or other information. The remote PBSF may send the request to the remote AAnF to obtain/receive the $K_{PBSF}$ for the first wireless communication device. In some embodiments, the remote PBSF may include the identifier of the remote PBSF in the request. The remote AAnF may derive/calculate/determine the $K_{PBSF}$ from the $K_{AKMA}$ (e.g., if the remote AAnF does not already have the $K_{PBSF}$). The remote AAnF may send/transmit/communicate a response (e.g., a Naanf_AKMA_ApplicationKey_Get response) to the remote PBSF. In certain embodiments, the response may include/provide/specify/indicate the $K_{PBSF}$ and/or the expiration time of the $K_{PBSF}$.

From step 710 to step 712, the remote PBSF may store/maintain the $K_{PBSF}$, and/or send/transmit a response (e.g., an application session establishment response) to the first wireless communication device (e.g., remote UE). In step 714, the first wireless communication device may derive/generate/create/determine the $K_{PBSF}$. In certain embodiments, the first wireless communication device may generate the $K_{PBSF}$ if the first wireless communication device does not derive the $K_{PBSF}$ prior to step 702 (e.g., prior to sending an application session establishment request message to a remote PBSF). In step 716, the first wireless communication device may discover/identify a second wireless communication device (e.g., a relay UE) based on (or by using) at least one of a plurality of approaches (e.g., model A and/or model B). In step 718, the first wireless communication device may send/transmit/communicate a request/message (e.g., a direct communication request) to the second wireless communication device. In some embodiments, the message/request may include/provide/specify/indicate the A-KID, the freshness parameter (e.g., Nonce_1), and/or a service code. The first wireless communication device may use the $K_{PBSF}$ to encrypt the freshness parameter (e.g., to output an encrypted version of the freshness parameter, thereby protecting against the second wireless communication device knowing the freshness parameter). In some embodiments, the message/request message (e.g., a direct communication request) may include the A-KID, the freshness parameter, and/or the identifier of the remote PBSF (e.g., the remote DDNMF ID). The first wireless communication device may encrypt the A-KID according to (or by using) the $K_{PBSF}$.

In step 720, the second wireless communication device (e.g., the relay UE) may send/transmit/communicate a message (e.g., a direct key request message) to the remote PBSF (e.g., remote DDNMF). In some embodiments, the second wireless communication device may obtain/acquire/determine the identifier of the remote PBSF according to (or based on) the received message (e.g., the direct communication request message), if the identifier of the remote PBSF is included in the received message (e.g., received by the second wireless communication device). In some embodiments, the second wireless communication device may obtain/acquire/determine the identifier of the remote PBSF according to (or by using) the A-KID (e.g., if the A-KID provided by the direct communication request message is unencrypted). In some embodiments, the message (e.g., the direct key request message) from the second wireless communication device to the remote PBSF may include/indicate the A-KID, the freshness parameter (e.g., Nonce 1), and/or other information. In step 722, the remote PBSF may use the $K_{PBSF}$ (e.g., stored in step 710) to decrypt/recover the encrypted A-KID, the freshness parameter, and/or other information. The remote PBSF can derive/determine/generate another validation token of the second wireless communication device ($K_{DIRECT}$). The remote PBSF can generate the another validation token (e.g., $K_{DIRECT}$) according to (or by using) the freshness parameter (e.g., Nonce 1) and/or the $K_{PBSF}$ (e.g., provided by the AAnF to the remote PBSF). In some embodiments, the remote PBSF may determine/generate other validation tokens, such as the $K_{DIRECT}$ ID. If the service code is received by the remote PBSF (e.g., via the direct key request message), the remote PBSF may determine whether the first wireless communication device can use the service indicated by the service code. In step 724, the remote PBSF may send/transmit/provide/specify the another validation token(s) (e.g., $K_{DIRECT}$ and/or $K_{DIRECT}$ ID) to the second wireless communication device. The remote PBSF may indicate the another validation token(s) via a response message (e.g., in a direct key response message and/or other messages).

In step 726, the second wireless communication device (e.g., the relay UE) may send/transmit/provide a command message (e.g., a direct security mode command message and/or other messages) to the first wireless communication device (e.g., the remote UE). The second wireless communication device may send/provide/transmit a second freshness parameter via the command message (e.g., included in the command message). The second freshness parameter can be used (e.g., by the first wireless communication device) to generate/create/determine the Ksession (e.g., a session key for a communication session between the first wireless communication device and the second wireless communication device). If the $K_{DIRECT}$ ID is received by the second wireless communication device, the command message may include/provide/specify the $K_{DIRECT}$ ID. The command message may be integrity protected according to (or by using) a security key derived from (or based on) the another validation token(s) (e.g., $K_{DIRECT}$ and/or $K_{DIRECT}$ ID).

In step 728, the first wireless communication device can derive/generate/create/determine at least one validation token (e.g., the $K_{DIRECT}$). The first wireless communication device may determine the validation token(s) by using (or according to) the freshness parameter (e.g., Nonce 1) and/or the $K_{PBSF}$. The first wireless communication device may compare/validate/match the validation token(s) (e.g., generated by the first wireless communication device) against the another validation token(s) (e.g., derived/generated by the second wireless communication device). If the validation token(s) and the another validation token(s) match (or correspond to each other), an attempt to access the network (e.g., attempt by the first wireless communication device) via the second wireless communication device may be authenticated/validated. The second wireless communication device may use the another validation token(s) (and/or another key derived from the another validation token) to protect/encrypt the command message (e.g., the direct security command message). If the second wireless communication device sends/provides/indicates the second freshness parameter to the first wireless communication device, the first wireless communication device can use the freshness parameter(s) to derive/generate/determine a new key to confirm/verify the security of the message. Otherwise, the first wireless communication device can use the validation token(s).

In some embodiments, the first wireless communication device may derive/determine/generate the $K_{DIRECT}$ ID. If the second wireless communication device sends/provides the second freshness parameter via the command message (e.g., the direct security mode command message), the first wireless communication device may generate/determine/create a Ksession. In some embodiments, the second wireless communication device may use a security key (e.g., $K_{DIRECT}$ and/or another key derived from $K_{DIRECT}$) to protect/encrypt/secure the command message. The first wireless communication device may perform a security verification of the command message. If the first wireless communication device receives a $K_{DIRECT}$ ID from the second wireless communication device, the first wireless communication device may compare/validate/match the received $K_{DIRECT}$ ID (e.g., received from the second wireless communication device) against the generated/determined $K_{DIRECT}$ ID (e.g., generated by the first wireless communication device). If the received $K_{DIRECT}$ ID and the generated $K_{DIRECT}$ ID match (or correspond to each other), an attempt to access the network (e.g., attempt by the first wireless communication device) via the second wireless communication device may be authenticated/validated. In step 730, the first wireless communication device may respond with a complete message (e.g., a direct security mode complete message and/or other messages) to the second wireless communication device. In step 732, the second wireless communication device may send/transmit/provide a direct communication accept message (or other messages) to the first wireless communication device.

Figure 8:
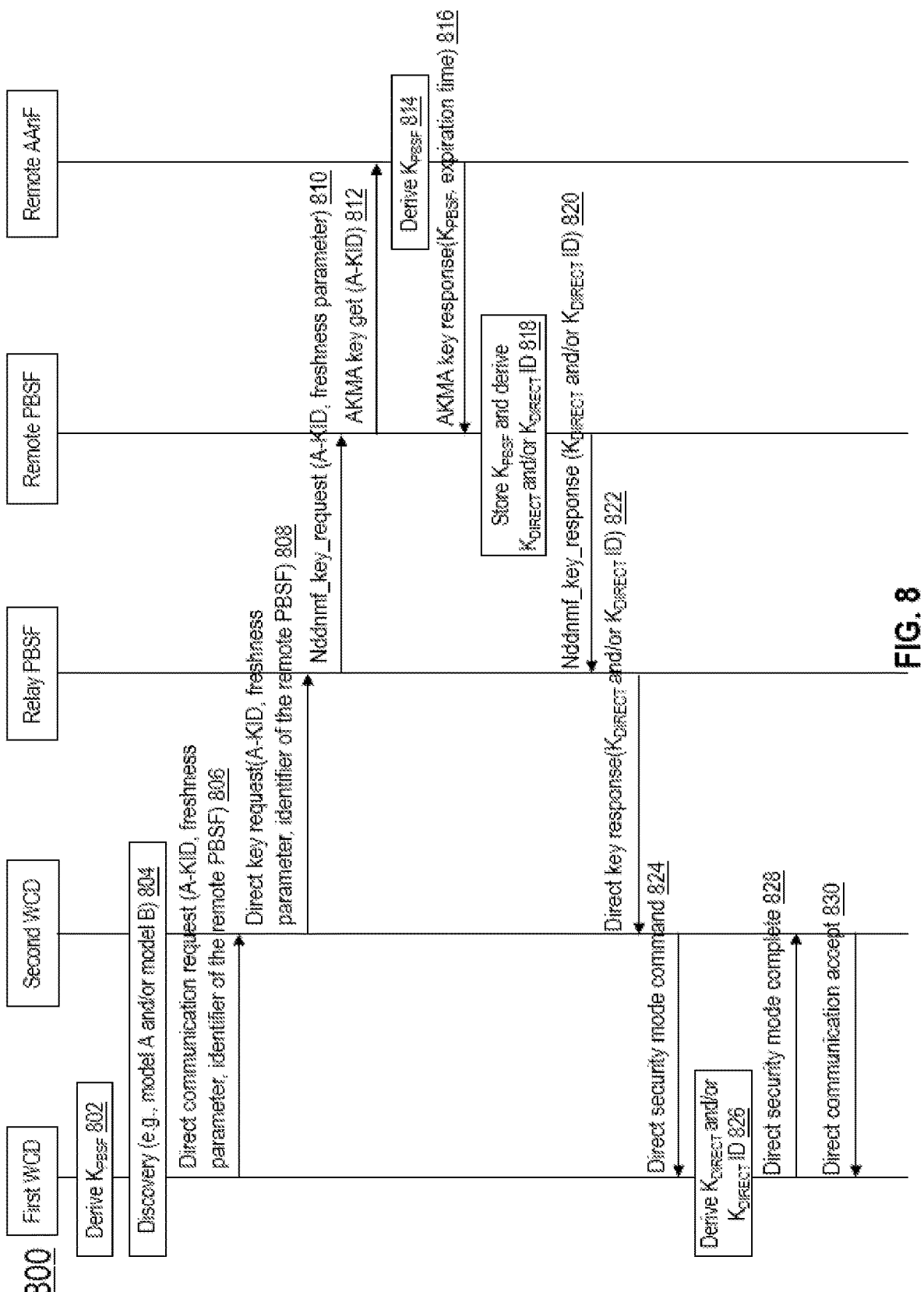

Referring now to FIG. 8, depicted is a communication diagram of an embodiment for a process 800 for accessing a network by using another wireless communication device (e.g., a relay UE) as a relay node (e.g., UE-to-network relay). In step 802, a first wireless communication device (e.g., a remote UE) may determine/generate/derive the $K_{PBSF}$ prior to sending/transmitting a message. In step 804, the first wireless communication device may discover/identify/select a second wireless communication device (e.g., a relay UE) based on (or by using) at least one of a plurality of approaches (e.g., model A and/or model B). In step 806, the first wireless communication device may send/transmit/communicate a request/message (e.g., a direct communication request) to the second wireless communication device. In some embodiments, the message/request may include/provide/specify/indicate the A-KID, the freshness parameter (e.g., Nonce_1), and/or a service code. The first wireless communication device may use the $K_{PBSF}$ to encrypt the freshness parameter (e.g., to output an encrypted version of the freshness parameter, thereby protecting against the second wireless communication device knowing the freshness parameter). In some embodiments, the message/request may include the A-KID, the freshness parameter, and/or the identifier of the remote PBSF (e.g., the remote DDNMF ID). The first wireless communication device may encrypt the A-KID according to (or by using) the $K_{PBSF}$.

In step 808, the second wireless communication device (e.g., a relay UE) may send/transmit/communicate a message (e.g., a direct key request message) to a relay PBSF (e.g., a relay DDNMF). The message can include/provide/specify the parameter(s) (e.g., the A-KID, the freshness parameter, and/or the identifier of the remote PBSF)

included in the prior message (e.g., direct communication request) from the first wireless communication device to the second wireless communication device. In step 810, the relay PBSF may obtain the identifier of the remote PBSF from the received message (e.g., a direct key request message). The relay PBSF may send/transmit/communicate a Nddnmf_key_request message (or other messages) to the remote PBSF according to (or based on) the identifier of the remote PBSF. The Nddnmf_key_request message may include/indicate/specify the A-KID, the freshness parameter, and/or other information. In some embodiments, the relay PBSF may obtain/determine the identifier of the remote PBSF from the received message (e.g., the direct key request message), if the identifier is included in the received message. In some embodiments, the relay PBSF may obtain the identifier of the remote PBSF by using (or according to) the A-KID (e.g., if the A-KID included in the received message (the direct key request message) is unencrypted). The Nddnmf_key_request message can include/provide/specify/ indicate the A-KID, the freshness parameter (e.g., Nonce 1 and/or other freshness parameters), and/or other information. If the service code is included in step 806 (e.g., in the direct communication request from the first wireless communication device to the second wireless communication device), the Nddnmf_key_request message (or other messages) may include the service code.

In step 812 to step 816, the remote PBSF may determine whether the remote PBSF has (or can access) an active context associated with the A-KID. If the remote PBSF does not have (or cannot access) the active context, the remote PBSF may send/transmit/communicate a request (e.g., a Naanf_AKMA_ApplicationKey_Get request and/or other requests) to a remote AAnF. In some embodiments, the request may include/indicate the A-KID and/or other information. The remote PBSF may send the request to the remote AAnF to obtain/receive the $K_{PBSF}$ for the first wireless communication device. In some embodiments, the remote PBSF may include the identifier of the remote PBSF in the request. The remote AAnF may derive/calculate/ determine the $K_{PBSF}$ from the $K_{AKMA}$ (e.g., if the remote AAnF does not already have the $K_{PBSF}$). The remote AAnF may send/transmit/communicate a response (e.g., a Naan-f_AKMA_ApplicationKey_Get response) to the remote PBSF. In certain embodiments, the response may include/ provide/specify/indicate the $K_{PBSF}$ and/or the expiration time of the $K_{PBSF}$.

In step 818, the remote PBSF may store/maintain the $K_{PBSF}$. The remote PBSF may derive/generate another vali-dation token, such as $K_{DIRECT}$ and/or a $K_{DIRECT}$ ID, using the freshness parameter (e.g., Nonce 1), the $K_{PBSF}$, and/or other information. In step 820, the remote PBSF may send/transmit/provide/indicate the another validation token(s) to a relay PBSF. The remote PBSF may provide the another validation token(s) (e.g., $K_{DIRECT}$ and/or $K_{DIRECT}$ ID) via the Nddnmf_key_response message (or other mes-sages). In step 822, the relay PBSF may forward/provide/ communicate/send the another validation token(s) (e.g., the $K_{DIRECT}$ and/or $K_{DIRECT}$ ID) in a response message (e.g., a direct key response message) to the second wireless com-munication device. If the $K_{DIRECT}$ ID is received by the relay PBSF, the response message (e.g., from the relay PBSF to second wireless communication device) can include/indicate the $K_{DIRECT}$ ID.

In step 824, the second wireless communication device (e.g., the relay UE) may send/transmit/provide a command message (e.g., a direct security mode command message and/or other messages) to the first wireless communication device (e.g., the remote UE). The second wireless commu-nication device may send/provide/transmit a second fresh-ness parameter via the command message. The second freshness parameter can be used (e.g., by the first wireless communication device) to generate/create/determine a ses-sion key (Ksession) for a communication session between the first wireless communication device and the second wireless communication device. If the $K_{DIRECT}$ ID is received by the second wireless communication device, the command message may include/provide/specify the $K_{DIRECT}$ ID. The command message may be integrity pro-tected according to (or by using) a security key derived from (or based on) the another validation token(s) (e.g., $K_{DIRECT}$ and/or $K_{DIRECT}$ ID).

In step 826, the first wireless communication device can derive/generate/create/determine at least one validation token (e.g., the $K_{DIRECT}$). The first wireless communication device may determine the validation token(s) by using (or according to) the freshness parameter (e.g., Nonce 1) and/or the $K_{PBSF}$. In some embodiments, the first wireless com-munication device may derive/determine/generate the $K_{DI-RECT}$ ID. If the second wireless communication device sends/provides the second freshness parameter via the com-mand message (e.g., the direct security mode command message), the first wireless communication device may generate/determine/create a Ksession. In some embodi-ments, the second wireless communication device may use a security key (e.g., $K_{DIRECT}$ and/or another key derived from $K_{DIRECT}$) to protect/encrypt the command message. If the first wireless communication device receives a $K_{DIRECT}$ ID from the second wireless communication device, the first wireless communication device may compare/validate/ match the received $K_{DIRECT}$ ID (e.g., received from the second wireless communication device) against the gener-ated/determined $K_{DIRECT}$ ID (e.g., generated by the first wireless communication device). If the received $K_{DIRECT}$ ID and the generated $K_{DIRECT}$ ID match (or correspond to each other), an attempt to access the network (e.g., attempt by the first wireless communication device) via the second wireless communication device may be authenticated/validated. In step 828, the first wireless communication device may respond with a complete message (e.g., a direct security mode complete message and/or other messages) to the second wireless communication device. In step 830, the second wireless communication device may send/transmit/ provide a direct communication accept message (or other messages) to the first wireless communication device.

Figure 9:
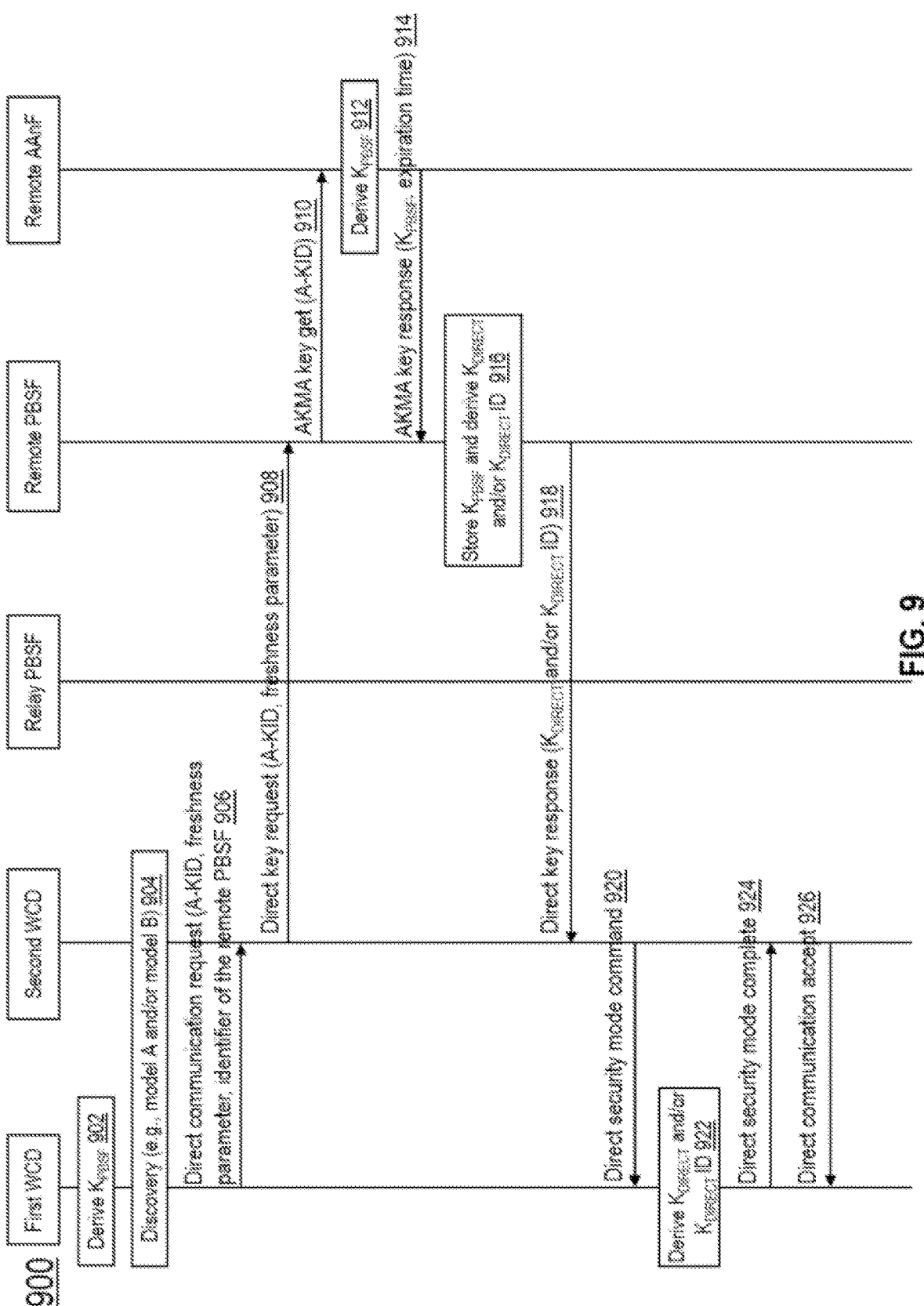

Referring now to FIG. 9, depicted is a communication diagram of an embodiment for a process 900 for accessing a network by using another wireless communication device (e.g., a relay UE) as a relay node (e.g., UE-to-network relay). In step 902, a first wireless communication device (e.g., a remote UE) may determine/generate/derive the $K_{PBSF}$ (or other information) prior to sending/transmitting a message. In step 904, the first wireless communication device may discover/identify/select/engage a second wire-less communication device (e.g., a relay UE) based on (or by using) at least one of a plurality of approaches (e.g., model A and/or model B). In step 906, the first wireless commu-nication device may send/transmit/communicate a request/ message (e.g., a direct communication request) to the second wireless communication device. In some embodiments, the message/request may include/provide/specify/indicate the A-KID, the freshness parameter (e.g., Nonce_1), and/or a service code. The first wireless communication device may use the $K_{PBSF}$ to encrypt the freshness parameter (e.g., to output an encrypted version of the freshness parameter, thereby protecting against the second wireless communication device knowing the freshness parameter). In some embodiments, the message/request may include the A-KID, the freshness parameter, and/or the identifier of the remote PBSF (e.g., the remote DDNMF ID). The first wireless communication device may encrypt the A-KID according to (or by using) the $K_{PBSF}$.

In step 908, the second wireless communication device (e.g., a relay UE) may send/transmit/communicate a message (e.g., a direct key request message) to a remote PBSF PBSF (e.g., a remote DDNMF). The second wireless communication device may obtain the identifier of the remote PBSF from the received message (e.g., the direct communication request message). In some embodiments, the second wireless communication device may obtain/determine the identifier of the remote PBSF from the received message (e.g., the direct key request message), if the identifier is included in the received message. In some embodiments, the second wireless communication device may obtain the identifier of the remote PBSF by using (or according to) the A-KID (e.g., if the A-KID included in the received message (the direct communication request message) is unencrypted). The received message (e.g., the direct communication request message) message can include/provide/specify/indicate the A-KID, the freshness parameter (e.g., Nonce 1 and/or other freshness parameters), and/or other information. If the service code is included in step 906 (e.g., in the direct communication request from the first wireless communication device to the second wireless communication device), the received message may include the service code. In some embodiments, the direct key request message can include the A-KID, the freshness parameter, and/or other information.

In step 910 to step 914, the remote PBSF may determine whether the remote PBSF has (or can access) an active context associated with the A-KID. If the remote PBSF does not have (or cannot access) the active context, the remote PBSF may send/transmit/communicate a request (e.g., a Naanf_AKMA_ApplicationKey_Get request and/or other requests) to a remote AAnF. In some embodiments, the request may include/indicate the A-KID and/or other information. The remote PBSF may send the request to the remote AAnF to obtain/receive the $K_{PBSF}$ for the first wireless communication device. In some embodiments, the remote PBSF may include the identifier of the remote PBSF in the request. The remote AAnF may derive/calculate/determine the $K_{PBSF}$ from the $K_{AKMA}$ (e.g., if the remote AAnF does not already have the $K_{PBSF}$). The remote AAnF may send/transmit/communicate a response (e.g., a Naanf_AKMA_ApplicationKey_Get response) to the remote PBSF. In certain embodiments, the response may include/provide/specify/indicate the $K_{PBSF}$ and/or the expiration time of the $K_{PBSF}$.

In step 916, the remote PBSF may store/maintain the $K_{PBSF}$ (or other information). The remote PBSF may derive/generate another validation token, such as a $K_{DIRECT}$ and/or a $K_{DIRECT}$ ID, using the freshness parameter (e.g., Nonce 1), the $K_{PBSF}$, and/or other information. In step 918, the remote PBSF may send/transmit/provide/indicate the another validation token(s) to the second wireless communication device. The remote PBSF may provide the another validation token(s) (e.g., $K_{DIRECT}$ and/or $K_{DIRECT}$ ID) via a direct key response message (or other messages). In step 920, the second wireless communication device (e.g., the relay UE) may send/transmit/provide a command message (e.g., a direct security mode command message and/or other messages) to the first wireless communication device (e.g., the remote UE). The second wireless communication device may send/provide/transmit a second freshness parameter via the command message. The second freshness parameter can be used (e.g., by the first wireless communication device) to generate/create/determine a session key (Ksession) for a communication session between the first wireless communication device and the second wireless communication device. If the $K_{DIRECT}$ ID is received by the second wireless communication device, the command message may include/provide/specify the $K_{DIRECT}$ ID. The command message may be integrity protected according to (or by using) a security key derived from (or based on) the another validation token(s) (e.g., $K_{DIRECT}$ and/or $K_{DIRECT}$ ID).

In step 922, the first wireless communication device can derive/generate/create/determine at least one validation token (e.g., the $K_{DIRECT}$ and/or $K_{DIRECT}$ ID). The first wireless communication device may determine the validation token(s) by using (or according to) the freshness parameter (e.g., Nonce 1) and/or the $K_{PBSF}$. In some embodiments, the first wireless communication device may derive/determine/generate the $K_{DIRECT}$ ID. If the second wireless communication device sends/provides the second freshness parameter via the command message (e.g., the direct security mode command message), the first wireless communication device may generate/determine/create a Ksession. In step 924, the first wireless communication device may respond with a complete message (e.g., a direct security mode complete message and/or other messages) to the second wireless communication device. In step 926, the second wireless communication device may send/transmit/provide a direct communication accept message (or other messages) to the first wireless communication device.

I. Authorization of Proximity Based Services

Figure 10:
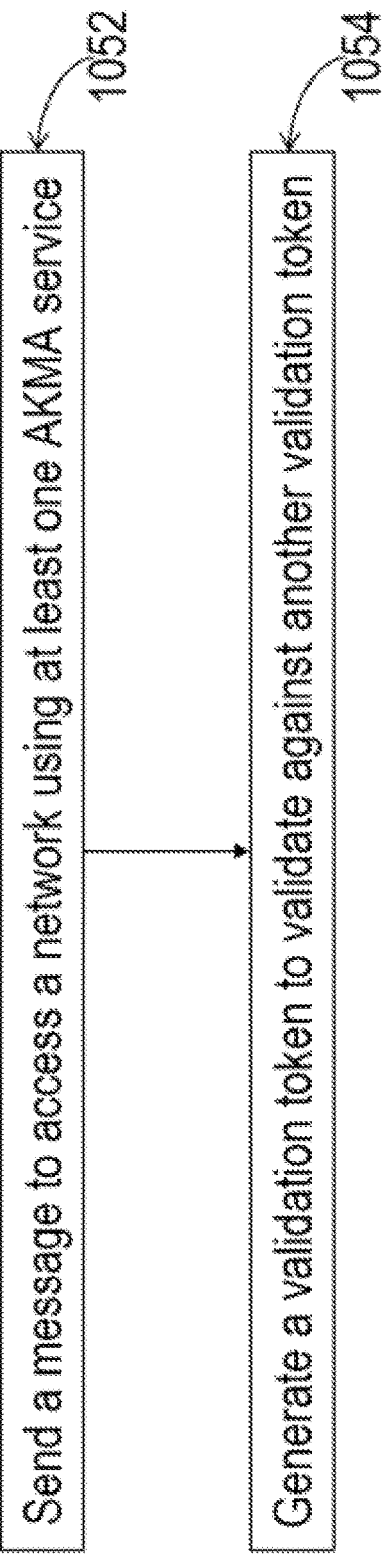
FIG. 10 illustrates a flow diagram of an example method for authorization of proximity based services, in accordance with an embodiment of the present disclosure.

FIG. 10 illustrates a flow diagram of a method 1050 for authorization of proximity based services. The method 1050 may be implemented using any of the components and devices detailed herein in conjunction with FIGS. 1-9. In overview, the method 1050 may include sending a message to access a network using at least one AKMA service (1052). The method 1050 may include generating a validation token to validate against another validation token (1054).

Referring now to operation (1052), and in some embodiments, a first wireless communication device (e.g., a remote UE) may send/transmit/communicate/provide a message to a second wireless communication device (e.g., a relay UE). The message can include or correspond to a message to access a network (e.g., 5GC network) via the second wireless communication device as a relay node (e.g., by using UE-to-network relay) using at least one AKMA service. The message can include/specify/indicate an A-KID, a freshness parameter (e.g., Nonce 1), and/or other information. In some embodiments, the message may include a service code. The service code may be configured to specify and/or restrict a use of a particular service to access the network. In some embodiments, the $K_{PBSF}$ may be associated with (or related to) with the service code. In some embodiments, the first wireless communication device may comprise a remote user equipment (UE). In some embodiments, the second wireless communication device may comprise a relay UE.

Referring now to operation (1054), and in some embodiments, the first wireless communication device may generate/configure/create/derive/compute/calculate a validation token (e.g., a $K_{DIRECT}$ and/or a $K_{DIRECT}$ ID). In some embodiments, the validation token may comprise at least one of: a validation key ($K_{DIRECT}$) and/or an identifier (ID) of the $K_{DIRECT}$. The first wireless communication device may use the freshness parameter, a $K_{PBSF}$, and/or other information to generate the validation token. The $K_{PBSF}$ may include or correspond to a key of a PBSF function, such as the DDNMF and/or a ProSe key management function (PKMF). The validation token may be to validate/authenticate against another validation token of the second wireless communication device. The another validation token may include or correspond to a $K_{DIRECT}$ and/or a $K_{DIRECT}$ ID generated/derived by a remote PBSF. For instance, the remote PBSF may use a freshness parameter, a $K_{PBSF}$, and/or other information to generate the validation token. The $K_{DIRECT}$ and/or $K_{DIRECT}$ ID (e.g., generated by the remote PBSF) can be provided directly (e.g. via a message from the remote PBSF) and/or indirectly (e.g., via a relay PBSF) to the second wireless communication device from the remote PBSF. In some embodiments, the another validation token may be a key derived from (or generated by using) the $K_{DIRECT}$ and/or a $K_{DIRECT}$ ID.

In some embodiments, the first wireless communication device may generate/calculate/derive/determine the $K_{PBSF}$ prior to or after sending an application session establishment request message to a remote PBSF. For example, the first wireless communication device may send/transmit/communicate the application session establishment request message to the remote PBSF, the application session establishment request message providing/specifying the A-KID (and/or other information). Responsive to receiving the application session establishment request message, the remote PBSF may communicate with a remote AAnF to generate/determine/configure a $K_{PBSF}$, wherein the remote PBSF can store/maintain the generated $K_{PBSF}$. Once the remote PBSF stores the $K_{PBSF}$ (e.g., generated by the remote AAnF), the remote PBSF may send/transmit a response (e.g., an application session establishment response) to the first wireless communication device. Upon receiving the response, the first wireless communication device may generate/determine/derive its own $K_{PBSF}$.

In some embodiments, the first wireless communication device may perform encryption on the freshness parameter (e.g., Nonce 1) and/or the A-KID. For instance, the first wireless communication device may perform encryption on the freshness parameter using the $K_{PBSF}$ (or other keys). The first wireless communication device may perform encryption of the freshness parameter to provide protection against the second wireless communication device accessing/knowing the freshness parameter. In another example, the first wireless communication device may use the $K_{PBSF}$ to perform the encryption on the A-KID. Performing encryption on the freshness parameter and/or the A-KID can output an encrypted version of the freshness parameter and/or the A-KID. In some embodiments, the message (e.g., the message sent from the first wireless communication device to the second wireless communication device) may include/provide/indicate the encrypted version of the freshness parameter and/or the A-KID. In some embodiments, the message may further include/provide/specify/indicate an identifier of the remote PBSF (e.g., Remote DDNMF ID). In some embodiments, the remote PBSF may use the freshness parameter, the $K_{PBSF}$, and/or other information to generate/create/determine the another validation token. For instance, the remote PBSF may generate/determine the another validation token (e.g., the $K_{DIRECT}$ and/or the $K_{DIRECT}$ ID) according to (or by using) the freshness parameter from the second wireless communication device (e.g., the freshness parameter provided via a direct key request message or other messages) and/or the $K_{PBSF}$ from an AAnF (e.g., the $K_{PBSF}$ provided via a Naanf_AKMA_ApplicationKey_Get response or other messages). In another example, the remote PBSF may generate the another validation token based on (or by using) the freshness parameter from a relay PBSF of the second wireless communication device (e.g., the freshness parameter provided via a Nddnmf_key_request message or other messages) and/or the $K_{PBSF}$ from the AAnF.

In some embodiments, the remote PBSF may receive/obtain an encrypted version of the freshness parameter (e.g., encrypted by the first wireless communication device according to the $K_{PBSF}$) from the second wireless communication device. In certain embodiments, the remote PBSF may receive the encrypted version of the freshness parameter from the relay PBSF. The remote PBSF may recover/unencrypt the freshness parameter according to (or by using) the $K_{PBSF}$ from the AAnF (e.g., generated by the AAnF). In some embodiments, the second wireless communication device may receive/obtain the another validation token(s) (e.g., the $K_{DIRECT}$ and/or the $K_{DIRECT}$ ID) directly from the remote PBSF (e.g., via a message, such as a direct key response message). In certain embodiments, the second wireless communication device may receive the another validation token(s) indirectly from the remote PBSF via the relay PBSF (e.g., using a direct key response message, such as in step 628 of FIG. 6). In some embodiments, the first wireless communication device may send/transmit/communicate a direct security mode complete message to the second wireless communication device (e.g., responsive to the first wireless communication device generating the validation token). In some embodiments, the first wireless communication device may receive/obtain a direct communication accept message from the second wireless communication device (e.g., responsive to the second wireless communication device receiving the direct security mode complete message). In some embodiments, the first wireless communication device may receive/obtain a second freshness parameter from the second wireless communication device. The second freshness parameter may be associated with (or related to) the validation token. For instance, the first wireless communication device may receive the second freshness parameter via a message protected/encrypted using the $K_{DIRECT}$ (and/or another key derived from $K_{DIRECT}$). In some embodiments, the first wireless communication device may generate/determine the Ksession using (or according to) the second freshness parameter. The first wireless communication device can use the Ksession to protect/encrypt the direct security mode command message (or other messages).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method, comprising:
sending, by a first wireless communication device to a second wireless communication device, a message to access a network via the second wireless communication device as a relay node, using at least one authentication and key management for applications (AKMA) service, the message including an AKMA key identifier (A-KID) and a freshness parameter; and
generating, by the first wireless communication device using the freshness parameter and a proximity based service function (PBSF) key ($K_{PBSF}$), a validation token to validate against another validation token of the second wireless communication device.

2. The method of claim 1, wherein the first wireless communication device comprises a remote user equipment (UE), and the second wireless communication device comprises a relay UE.

3. The method of claim 1, comprising generating, by the first wireless communication device, the $K_{PBSF}$ prior to or after sending an application session establishment request message to a remote PBSF.

4. The method of claim 3, comprising:
performing, by the first wireless communication device, encryption on the freshness parameter using the $K_{PBSF}$, to output an encrypted version of the freshness parameter; and sending, by the first wireless communication device, the message to the second wireless communication device, the message including the encrypted version of the freshness parameter.

5. The method of claim 3, comprising:

performing, by the first wireless communication device, encryption on the A-KID using the $K_{PBSF}$, to output an encrypted version of the A-KID; and sending, by the first wireless communication device, the message to the second wireless communication device, the message including the encrypted version of the A-KID.

6. The method of claim 3, wherein the message further includes an identifier of the remote PBSF.

7. The method of claim 3, wherein the remote PBSF uses the freshness parameter from the second wireless communication device or a relay PBSF of the second wireless communication device, and the $K_{PBSF}$ from an AKMA anchor function (AAnF), to generate the another validation token.

8. The method of claim 7, wherein the remote PBSF receives an encrypted version of the freshness parameter from the second wireless communication device or the relay PBSF, and recovers the freshness parameter using the $K_{PBSF}$ from the AAnF.

9. The method of claim 7, wherein the second wireless communication device receives the another validation token directly from the remote PBSF, or indirectly from the remote PBSF via the relay PBSF.

10. The method of claim 1, comprising:

sending, by the first wireless communication device to the second wireless communication device, a direct security mode complete message; and receiving, by the first wireless communication device from the second wireless communication device, a direct communication accept message.

11. The method of claim 1, comprising:

receiving, by the first wireless communication device from the second wireless communication device, a second freshness parameter associated with the validation token; and generating, by the first wireless communication device using the second freshness parameter, a session key (Ksession) for a communication session between the first wireless communication device and the second wireless communication device.

12. The method of claim 1, wherein the message includes a service code or the $K_{PBSF}$ is associated with the service code, the service code configured to specify or restrict to use of a particular service to access the network.

13. The method of claim 1, wherein the validation token comprises at least one of: a validation key ($K_{DIRECT}$) or an identifier (ID) of the $K_{DIRECT}$.

14. A method, comprising:

generating, by a remote proximity based service function (PBSF) using a freshness parameter and a PBSF key ($K_{PBSF}$), a validation token to be validated against another validation token by a first wireless communication device, wherein the first wireless communication device sends to a second wireless communication device, a message to access a network via the second wireless communication device as a relay node, using at least one authentication and key management for applications (AKMA) service, the message including an AKMA key identifier (A-KID) and the freshness parameter.

15. The method of claim 14, wherein the first wireless communication device comprises a remote user equipment (UE), and the second wireless communication device comprises a relay UE.

16. The method of claim 14, wherein the first wireless communication device generates the $K_{PBSF}$ prior to or after sending an application session establishment request message to a remote PBSF.

17. The method of claim 16, wherein the first wireless communication device performs encryption on the freshness parameter using the $K_{PBSF}$, to output an encrypted version of the freshness parameter, and sends the message to the second wireless communication device, the message including the encrypted version of the freshness parameter.

18. The method of claim 16, wherein the first wireless communication device performs encryption on the A-KID using the $K_{PBSF}$, to output an encrypted version of the A-KID, and sends the message to the second wireless communication device, the message including the encrypted version of the A-KID.

19. A first wireless communication device, comprising:

at least one processor configured to:

send, via a transmitter, a message to access a network via the second wireless communication device as a relay node, using at least one authentication and key management for applications (AKMA) service, the message including an AKMA key identifier (A-KID) and a freshness parameter; and generate, using the freshness parameter and a proximity based service function (PBSF) key ($K_{PBSF}$), a validation token to validate against another validation token of the second wireless communication device.

20. A remote proximity based service function (PBSF), comprising:

at least one processor configured to:

generate, using a freshness parameter and a PBSF key ($K_{PBSF}$), a validation token to be validated against another validation token by a first wireless communication device, wherein the first wireless communication device sends to a second wireless communication device, a message to access a network via the second wireless communication device as a relay node, using at least one authentication and key management for applications (AKMA) service, the message including an AKMA key identifier (A-KID) and the freshness parameter.

* * * * *